United States Patent Office 3,554,991
Patented Jan. 12, 1971

3,554,991
CRYSTALLINE OLEFINIC NITRILE POLYMERS AND METHOD FOR MANUFACTURING SAME
Russell K. Griffith, Chagrin Falls, Ohio, assignor to The Standard Oil Company, Cleveland, Ohio, a corporation of Ohio
No Drawing. Original application Oct. 3, 1966, Ser. No. 583,958, now Patent No. 3,493,648, dated Feb. 3, 1970. Divided and this application Mar. 5, 1969, Ser. No. 804,711
Int. Cl. C08f 3/76, 15/22
U.S. Cl. 260—88.7   2 Claims

ABSTRACT OF THE DISCLOSURE

Olefinic nitrile polymers, such as polyacrylonitrile, are subjected to shearing on a roll mill and the thus sheared polymer, which has 3-dimensional crystallinity, is molded into articles having excellent heat distortion and impact properties.

---

This is a divisional application of my copending U.S. patent application Ser. No. 583,958 filed Oct. 3, 1966, now U.S. Pat. No. 3,493,648.

The present invention is concerned with olefinic nitrile polymers having 3-dimensional crystallinity, to the method for preparing them and to novel articles prepared therefrom by molding.

Olefinic nitrile polymers such as acrylonitrile polymers have many excellent physical and chemical properties which are highly desirable in shaped articles; however, shaped articles from these polymers have had to be formed by other than conventional means heretofore, and the unreinforced articles prepared therefrom are generally quite brittle and possess relatively poor physical properties. The failure of many acrylonitrile polymers to respond to conventional thermoforming techniques is decidedly disadvantageous and could very well be the reason why shaped articles based on acrylonitrile polymers, other than fibers which are ordinarily spun from solutions, are not widely available for use in commerce. One novel commercially practical method for the production of acrylonitrile polymer shaped articles is disclosed and claimed in my copending U.S. patent application Ser. No. 530,408 filed Feb. 28, 1966, now U.S. Pat. No. 3,412,177 issued Nov. 19, 1968. Acrylonitrile polymers, and polyacrylonitrile in particular, have been available for many years. No known commercially feasible molding process for polyacrylonitrile articles of good physical properties was known prior to the process described in my aforementioned U.S. Pat. No. 3,412,177. The present invention provides another commercially practical means for preparing molded polyacrylonitrile articles of excellent physical properties.

Most previous attempts to subject acrylonitrile to bulk polymerization reported in the literature have produced at least in part opaque, powdery, flocculate or agglomerated precipitates of polyacrylonitrile. The products so obtained are similar to those obtained by polymerization of acrylonitrile in a liquid medium, e.g., water. It is known that liquid acrylonitrile free of inhibitors and in the presence of a suitable polymerization initiator will polymerize quite rapidly. Because of this tendency toward rapid polymerization, the bulk polymerization of acrylonitrile is most difficult to control and often results in a very rapid and sometimes explosive reaction. In this regard see Journal of Polymer Science, vol. 13, pages 329–353 (1954) and the textbook "Vinyl and Related Polymers" by C. A. Schildknecht, pages 264–265.

Previously known polyacrylonitrile prepared either in bulk or in a liquid medium was generally a white or yellowish opaque powder. It is well known that polyacrylonitrile powder can be processed into fibers or films from a polar solvent by spinning or other wet processes. Attempts to mold polyacrylonitrile powder by fusion into void-free 3-dimensional bodies having good physical properties have not previously been successful, primarily because the high temperatures required for molding are in the same range as the temperature of decomposition of the polymer. (The textbook, "Fibers, Plastics and Rubbers" by W. J. Roff, Butterworths, 1956, London, states at page 186 in reference to polyacrylonitrile that "the polymer softens with charring and decomposition at 270° C.").

The production of solid, partially transparent bodies of polyacrylonitrile by a special bulk polymerization procedure has been described in British Pat. No. 964,533. In this prior art process, a mixture of acrylonitrile monomer and acrylonitrile polymer containing certain polymerization initiators and promoters and optionally additives such as plasticizers, fillers, reinforcing agents and heat and radiation stabilizers are left to stand at a temperature not exceeding 60° C. until a clear polyacrylonitrile forms which is still in contact with unpolymerized acrylonitrile monomer. This prior art process requires long reaction periods of at least fourteen hours up to a month or more and obviously is not attractive from a commercial production standpoint, because in addition to the lengthy reaction period, some opaque polymer forms which must be removed from the clear polymer.

Polyacrylonitriles prepared by free-radical type polymerization normally show little evidence of crystallinity. The most prominent feature of the X-ray diagram is a fairly narrow ring. When filaments of polyacrylonitrile, especially those containing small amounts of solvent or water, are extended under the best conditions, very high degrees of orientation of the chain molecules can result in the fibers. The two prominent equatorial X-ray reflections (one of which is the second order of the other) indicate a high degree of order in one lateral direction resulting from the drawing process. (See "Vinyl and Related Polymers" by C. A. Schildknecht, pages 275–276, and Journal of Polymer Science, vol. 55, pages 531–549, 1961).

I have discovered a process for preparing acrylonitrile polymers which, unlike the prior art oriented fibers and films, are crystalline in all dimensions. These polymers are useful for preparing molded articles having excellent physical properties, said process comprising shearing the acrylonitrile polymer under pressure at an elevated temperature.

The term "shear" as used herein is to be taken to mean "simple shear" as it is normally defined. (See "The Physics of Rubber Elasticity," L. R. G. Treloar, Oxford, 1958, page 88.) That is, the sliding of planes of the polymer parallel to a given plane by an amount proportional to their distance from the given plane. Shearing is a constant volume process in which two dimensions of a unit cube of material remain constant during the deformation. This is to be contrasted with the fiber drawing process in which all dimensions of a unit cube are changed. In shear the applied force acting in the $x$ direction gives rise to a plane displacement, $u_x$, at a distance, $y$, from the reference plane and leads to a gradient $$\frac{\delta u_x}{\delta y}$$

perpendicular to the applied force and to the reference plane. An additional gradient $$\frac{\delta u_y}{\delta y}$$

is formed perpendicular to the plane defined by equal values of $u_x$. There are therefore two gradients acting at right angles to the plane undergoing a shear deformation. The technique of drawing, however, leads to a radially oriented gradient as well as one acting parallel to the applied force. The resulting displacements in drawing are not planar and do not lead to the same crystallinity on 3-dimensional order that one finds in sheared polyacrylonitrile.

For instance, according to my process, an acrylonitrile homopolymer in the form of a powder is passed through the rolls of a differential roll speed rubber mill in which the rolls are heated to about 150–500° F. to produce an opaque sheet of polymer. This sheet is broken up into a fluffy powder by cutting it into chunks which in turn are added to a high speed blending device such as a Waring blender. The resulting fluffy powder can be compression molded at temperatures in the range of from about 85–270° C. and pressures of at least 1000 p.s.i. into solid, clear articles such as dishes, cups, and the like which have excellent impact and heat distortion properties. Notched Izod impact strengths obtained on the molded products are in the range of from about 1 to 2 foot pounds per inch of notch, tensile strengths are in the range of 3 to $9 \times 10^3$ p.s.i. and flexural strengths range from about 7 to $13 \times 10^3$ p.s.i.

For the purposes of this invention the preferred olefinic nitriles are those having the structure

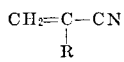

wherein R is a hydrogen, a lower alkyl group or a halogen. More preferred are acrylonitrile and methacrylonitrile and the most highly preferred olefinic nitrile is acrylonitrile.

The acrylonnitrile polymers useful in the present invention are those composed of a major amount of acrylonitrile. Preferred are acrylonitrile homopolymers and copolymers prepared from monomer mixtures of at least 70% by weight of acrylonitrile and up to 30% by weight of at least one other monomer copolymerizable with acrylonitrile. More preferred are polymers prepared from a mixture of at least 90% by weight of acrylonitrile. The other monomer copolymerizable with acrylonitrile can be either a monoalkenyl or a polyalkenyl monomer. The most preferred acrylonitrile polymer in the present invention is acrylonitrile homopolymer.

Useful monoalkenyl monomers include acrylic acid and the acrylate esters such as methyl acrylate, ethyl acrylate, the propyl acrylates, the butyl acrylates, the amyl acrylates, the hexyl acrylates, cyclohexyl acrylate, phenyl acrylate, the octyl acrylates and the like; methacrylic acid and methacrylate esters such as methyl methacrylate, ethyl methacrylate, the propyl methacrylates, the butyl methacrylates, the amyl methacrylates, the hexyl methacrylates, cyclohexyl methacrylate, phenyl methacrylate, the decyl methacrylates, and the like; vinyl esters such as vinyl acetate, vinyl propionate, the vinyl butyrates, vinyl benzoate, isopropenyl acetate, and the like; vinyl ethers such as ethyl vinyl ether, octyl vinyl ether, phenyl vinyl ether, and the like; the vinyl aromatics such as styrene, alpha-methyl styrene, vinyl toluene, the vinyl xylenes, the vinyl naphthalenes, isopropenyl benzene and the like; maleic acid, fumaric acid, itaconic acid, maleic anhydride, and esters such as dimethyl maleate, dimethyl fumarate, diethyl maleate, diethyl itaconate, and the like; vinyl amides such as acrylamide, methacrylamide, N-methyl acrylamide, N-methylol acrylamide, vinyl benzamide, N-vinyl pyrrolidone and the like; the vinyl halides such as vinyl chloride, vinyl bromide, vinyl fluoride, vinylidene fluoride, dichloro difluoro ethylene, tetrafluoroethylene and the like; olefins such as ethylene, propylene, butene-1 and the like; vinyl amines such as the vinyl pyridines, allyl amine, methallyl amines and others.

Useful polyalkenyl monomers include those having at least two vinyl groups per molecule such as allyl acrylate, allyl methacryate, diallyl maleate, diallyl fumarate, ethylene glycol dimaleate, diallyl itaconate, methallyl acrylate, divinyl ether, diallyl ether, dimethallyl ether, ethylene glycol dimethacrylate, 1,1,1-trimethoxypropane-dimethacrylate, glyceryl triacrylate, sucrose hexaacrylate, diallyl phthalate, triallyl cyanurate, 2,2,5,5-tetramethyl-1,5-hexadiene, 1,5-hexadiene, 1,6-heptadiene, 1,7-octadiene, 1,8-nonadiene, divinyl biphenyl, divinyl naphthalene, divinyl benzene, trivinyl benzene, diallyl benzene, diisopropenyl benzene, allyl allyloxyacetate, ethylidene dimethacrylate, methylene dimethacrylate, diallyl melamine, diallyl isomelamine, triallyl melamine, triallyl aconitate, triallyl phosphate, tetraallyl silane, tetravinyl silane, diallyl divinyl silane, tetraallyl germane, tetravinyl tin, tetravinyl germane, triacryloyl perhydrotriazine, trimethacryloyl perhydrotriazine, divinyl spirobi, methylene-bis-acrylamide, ethylene diacrylamide, N-allyl acrylamide, N,N-diallyl acrylamide, N,N-dimethallyl acrylamide, polyallyl ethers of polyhydric alcohols such as tetraallyl pentaerythritol, hexaallyl sucrose, hexaallyl inositol, hexaallyl sorbitol, hexavinyl sucrose, and the like, and others.

The acrylonitrile polymers useful in this invention may be prepared in any convenient manner such as by bulk, solution, emulsion or suspension polymerization techniques, all of which are well known to those skilled in the art. For the sake of convenience, however, it is preferred that the acrylonitrile polymers be prepared in an aqueous medium in the presence of a polymerization initiator. The polymerization reaction may be carried out by adding all of the monomer to the reaction mixture at once or in increments or in a continuous manner during the course of the reaction. A suitable emulsifier, surface active agent or dispersing agent is preferably used during the polymerization procedure in the preparation of the acrylonitrile polymers useful in this invention.

The acrylonitrile polymers embodied herein are resinous polymers usually having molecular weights of from about 10,000 to 1,000,000 or more and preferably above about 100,000.

The articles of the present invention are prepared by compression molding, injection molding, extrusion or similar techniques.

The articles produced by the instant process are useful in the production of dishes, cups, trays, tools, handles, knobs, electrical insulators, and the like. The products prepared by the instant process which are prepared without the presence of opaque fillers or pigments are transparent and are of particular interest as they have been found to be applicable in optics because of their high softening point, resistance to solvents and good scratch resistance.

In the following examples, which will further illustrate my invention, the amounts of the various ingredients are given in parts by weight unless otherwise indicated.

EXAMPLE 1

(A) An acrylonitrile copolymer was prepared from the following recipe:

| | Parts |
|---|---|
| (a) Water | 400 |
| (b) Emulsifier (GAFAC RE-610) [1] | 3.5 |
| (c) Ammonium persulfate | 0.5 |
| (d) Potassium metabisulfite | 0.23 |
| (e) t-Dodecyl mercaptan | 0.7 |
| (f) Acrylonitrile | 1.76 |
| (g) Butanediol-1,4-divinyl ether | 0.34 |
| (h) Acrylonitrile | 97.9 |

[1] A mixture of R—O—(CH$_2$CH$_2$O—)$_n$PO$_3$M$_2$ and

[R—O—(CH$_2$CH$_2$O—)$_n$]$_2$PO$_2$M wherein $n$ is a number of from 1 to 40, R is an alkyl or alkaryl group and preferably a nonyl phenyl group and M is hydrogen, ammonia or an alkali metal, which composition is sold by the General Aniline and Film Corporation.

Ingredients (a)–(e) were charged into a reactor and the temperature was brought to 50° C. with stirring. A nitrogen atmosphere was maintained in the reaction vessel. Ingredients (f) and (g) were added and polymerization of these two monomers was substantially completed in about a 90-minute period. Then the ingredient (h) was added continuously over a 195-minute period while the reaction mixture was maintained at 50° C. and the resulting polymer dispersion was stirred and heated at 50° C. for an additional 3 hours. The final product was a suspension of polymer in water from which the polymer was readily isolated by filtration. The isolated polymer was washed on the filter with water and was subsequently dried in an oven. The dried polymer was found by X-ray analysis to have a crystallinity of 33.0%.

(B) A portion of the foregoing polymer was sheared by being subjected to milling on a small differential roll rubber mill having the rolls at a temperature of 350–360° F. The powdery polymer formed a coarse sheet on the rubber mill. The sheet was found by X-ray analysis to have the following degrees of crystallinity:

| | Percent |
|---|---|
| Top | 73.3 |
| Side | 56.9 |
| End | 40.2 |

This sheet was broken up into chunks which in turn were reduced to small fluffy particles in a Waring blender which were leaf-like in nature and of about ⅛" diameter on the average.

Seven grams of the foregoing sheared, fluffy polymer (B) were placed in a metal mold cavity having the dimensions 5" x ½". A plunger was inserted into the mold cavity onto the polymer and the entire mold assembly was placed in a press provided with a heating element. A pressure of 7200 p.s.i. was placed on the polymer in the press and heating of the mold was commenced. After about 40 minutes a mold temperature of 160° C. was reached. Heating was stopped and the mold was then cooled to near room temperature. The molded bar of polymer was removed from the mold and it was found to be clear and transparent. The bar was found by A.S.T.M. tests to have a flexural strength of $12.3 \times 10^3$ p.s.i., a flexural modulus of $8.6 \times 10^5$ p.s.i., a tensile strength of $8.87 \times 10^3$ p.s.i., and an Izod notched impact strength of 1.07 foot pounds per inch of notch.

When unsheared original acrylonitrile polymer powder (A) was treated in the foregoing manner, a molded bar which was not completely transparent was obtained which was found by A.S.T.M. tests to have a flexural strength of $4.68 \times 10^3$ p.s.i., a flexural modulus of $5.65 \times 10^5$ p.s.i., a tensile strength of $1.67 \times 10^3$ p.s.i., and a notched Izod impact strength of 0.16 foot pound per inch of notch.

EXAMPLE 2

Molded bars were prepared as described in Example 1 using blends of polymers A and B of Example 1 with the following results:

| Polymer blend | | Flexural strength $\times 10^{-3}$ p.s.i. | Tensile strength $\times 10^{-3}$ p.s.i. | Izod impact, ft.lb./in. |
|---|---|---|---|---|
| A, g. | B, g. | | | |
| 6 | 2 | 6.55 | 7.5 | 0.4 |
| 4 | 4 | 6.98 | 4.92 | 0.71 |
| 2 | 6 | 9.61 | 13.6 | 1.32 |

EXAMPLE 3

(A) Polyacrylonitrile was prepared in an aqueous suspension by employing the following recipe:

| | Parts |
|---|---|
| Acrylonitrile | 100 |
| Water | 200 |
| Azobisisobutyronitrile | 0.5 |
| t-Dodecyl mercaptan | 1.2 |
| Polyvinyl pyrrolidone | 0.25 |

The polymerization was carried out for 6 hours with continuous stirring at 60° C. in a nitrogen atmosphere. The resulting slurry was separated by centrifugation, washed thoroughly with water and dried at 70° C. at reduced pressure.

(B) As in Example 1–B, some of the dried polymer from A of this example was sheared on a rubber mill.

As in Example 1, molded bars were prepared from polymers A and B of this example. The procedure used in preparing the molded bars was similar to that of Example 1 except that the final mold temperature was about 185° C. in the instant case. The molded bars from unsheared polymer A and sheared polymer B had the following physical properties:

| Polymer: | Flexural strength $\times 10^{-3}$ p.s.i. | Tensile strength $\times 10^{-3}$ p.s.i. | Izod impact, ft.lb./in. |
|---|---|---|---|
| A | 5.7 | 2.68 | 0.24 |
| B | 7.4 | 3.56 | 1.99 |

EXAMPLE 4

A bulk polyacrylonitrile was prepared as follows: 1150 mls. (926 grams or 100 parts by weight) of acrylonitrile, 13.8 grams (1.49 parts by weight) of t-dodecyl mercaptan and 2.0 grams (0.216 part by weight) of azoisobutyronitrile were stirred under nitrogen in a reactor which was connected to a filter via a pump in such a way that the precipitated polymer was removed as it formed in the monomer. The reactor was heated in a water bath at 60° C. A total of 52 grams of polyacrylonitrile was prepared in 24 minutes. The polymer was a fine white polymer when dried.

A repeat of steps A and B of Example 1 with the foregoing polymer gave results similar to those described in Example 1.

EXAMPLE 5

A polymer was prepared using the procedure of Example 3 from the following recipe:

| | Parts |
|---|---|
| Acrylonitrile | 100 |
| Water | 200 |
| t-Butyl pivalate | 0.1 |
| t-Dodecyl mercaptan | 0.8 |
| Ethyl acrylate | 5.0 |
| Polyvinyl pyrrolidone | 0.5 |

The resulting polymer was treated as in Example 4 with similar results.

EXAMPLE 6

A polymer was prepared using the procedure of Example 3 from the following recipe:

| | Parts |
|---|---|
| Acrylonitrile | 100 |
| Water | 200 |
| t-Butyl pivalate | 0.1 |
| t-Dodecyl mercaptan | 1.0 |
| Octyl vinyl ether | 10.0 |
| Polyvinyl pyrrolidone | 0.5 |

The resulting polymer was treated as in Example 4 with similar results.

I claim:
1. A molded article of an unplasticized, non-thermoplastic, sheared, three-dimensionally crystalline olefinic nitrile polymer having an average crystallinity of about 57 percent, selected from the group consisting of an acrylonitrile homopolymer and copolymer prepared by the free-radical catalyzed polymerization of a monomer mixture of at least 90 percent by weight of acrylonitrile and up to 10 percent by weight of at least one other monomer copolymerizable with acrylonitrile, said article having an Izod impact strength in the range of 1 to 2 foot pounds per inch of notch, and having been prepared by:

(A) shearing the unplasticized, non-thermoplastic, resinous olefinic nitrile polymer to impart three-dimensional crystallinity thereto, and (B) molding the sheared polymer from (A) at a temperature in the range of from about 85° to 270° F. and a pressure of at least 1000 p.s.i.

2. An olefinic nitrile polymer having an average three-dimensional crystallinity of about 57 percent obtained by shearing an unplasticized, non-thermoplastic, acrylonitrile homopolymer or a copolymer prepared by the free-radical catalyzed polymerization of a monomer mixture of at least 90 percent by weight of acrylonitrile and up to 10 percent by weight of at least one other monomer copolymerizable with acrylonitrile.

References Cited

UNITED STATES PATENTS

| | | | |
|---|---|---|---|
| 2,531,196 | 11/1950 | Brubaker et al. | 260—85.5(Orig.) |
| 2,560,680 | 7/1951 | Allewelt | 260—85.5(Orig.) |
| 2,606,176 | 8/1952 | Dunn | 260—85.5(Orig.) |
| 2,692,875 | 10/1954 | Weinstock et al. | 260—85.5(Orig.) |
| 2,710,846 | 6/1955 | Dietrich et al. | 260—29.6 |
| 3,069,402 | 12/1962 | Smart | 260—85.5N |
| 3,098,060 | 7/1963 | Miller | 260—88.7 |
| 3,132,122 | 5/1964 | Dunay et al. | 260—88.7 |
| 3,313,790 | 4/1967 | Baer | 260—88.7 |
| 3,412,177 | 11/1968 | Griffith | 260—88.7 |
| 3,103,503 | 9/1963 | Fox et al. | 260—89.5 |

HARRY WONG, JR., Primary Examiner

U.S. Cl. X.R.

260—9, 78.5, 85.5; 264—140, 176, 329, 331, 349